United States Patent
Ganguli et al.

(10) Patent No.: US 11,763,492 B1
(45) Date of Patent: Sep. 19, 2023

(54) APPARATUS AND METHODS TO CALIBRATE A STEREO CAMERA PAIR

(71) Applicant: PlusAI, Inc., Cupertino, CA (US)

(72) Inventors: Anurag Ganguli, Saratoga, CA (US); Timothy P. Daly, Jr., San Jose, CA (US); Mayank Gupta, Mountain View, CA (US); Wenbin Wang, Cupertino, CA (US); Huan Yang Chang, San Jose, CA (US)

(73) Assignee: PlusAI, Inc., Cupertino, CA (US)

( * ) Notice: Subject to any disclaimer, the term of this patent is extended or adjusted under 35 U.S.C. 154(b) by 0 days.

(21) Appl. No.: 17/837,389

(22) Filed: Jun. 10, 2022

(51) Int. Cl.
*G06T 7/80* (2017.01)
*G06T 7/593* (2017.01)
*H04N 13/239* (2018.01)
*H04N 13/00* (2018.01)
*B60W 60/00* (2020.01)

(52) U.S. Cl.
CPC .............. *G06T 7/85* (2017.01); *G06T 7/593* (2017.01); *H04N 13/239* (2018.05); *B60W 60/00* (2020.02); *B60W 2420/42* (2013.01); *G06T 2207/30252* (2013.01); *H04N 2013/0081* (2013.01)

(58) Field of Classification Search
CPC . G06T 7/85; G06T 7/593; G06T 2207/30252; H04N 13/239; H04N 2013/0081; B60W 60/00; B60W 2420/42
USPC .......................................................... 348/47
See application file for complete search history.

(56) References Cited

U.S. PATENT DOCUMENTS

| | | | |
|---|---|---|---|
| 9,674,505 B2* | 6/2017 | Wu | H04N 23/45 |
| 10,992,921 B1* | 4/2021 | Cui | B64D 43/00 |
| 2014/0241612 A1* | 8/2014 | Rhemann | G06T 7/521 |
| | | | 382/154 |
| 2020/0077073 A1* | 3/2020 | Nash | H04N 13/239 |
| 2021/0225035 A1* | 7/2021 | Devitt | G06T 1/0007 |
| 2021/0327092 A1* | 10/2021 | Jiang | H04N 13/243 |

* cited by examiner

*Primary Examiner* — Susan E. Torgerson
(74) *Attorney, Agent, or Firm* — Sheppard Mullin Richter & Hampton LLP

(57) ABSTRACT

In some embodiments, a method includes receiving a first image and a second image from a stereo camera pair. The method includes selecting a first row of pixels from the rectified image and a set of rows of pixels from the second image and comparing the first row of pixels with each row of pixels from the set of rows of pixels to determine disparity values. The method includes determining a pair of rows of pixels having the first row of pixels and a second row of pixels from the set of rows of pixels. The pair of rows of pixels has an offset no greater than an offset between the first row of pixels and each row of pixels from remaining rows of pixels. The method includes adjusting, based on the offset, the relative rotational position between the first stereo camera and the second stereo camera.

20 Claims, 3 Drawing Sheets

APPARATUS AND METHODS TO CALIBRATE A STEREO CAMERA PAIR

TECHNICAL FIELD

Some embodiments described herein relate to a computer-implemented apparatus and method to calibrate a stereo camera pair.

BACKGROUND

A stereo camera pair (also referred to as a stereo camera system) includes two cameras (or image sensors) used to capture two pictures (or videos) at the same time (also referred to herein as a stereo image pair(s)). The stereo image pair(s), including one primary image and one secondary image, can be used to produce a three-dimensional image of the field of view of the stereo camera pair. In the field of autonomous driving, a stereo camera pair can be deployed on the ego vehicle to acquire primary and second images (e.g., left and right images), and used to capture the surrounding scenes in different perspectives. Based on such a stereo image pair(s) of the same scene, the distances between the objects in the scene and the ego vehicle can be determined. The two cameras in the stereo camera pair, however, can disadvantageously move relatively to each other over time and the calibration of the two cameras on-the-fly can be computationally intensive.

Thus, a need exists for a method and a system to provide accurate on-the-fly calibration of the stereo camera pair in a computationally efficient manner.

SUMMARY

In some embodiments, a method includes receiving a first image from a first stereo camera of a stereo camera pair and a second image from a second stereo camera of the stereo camera pair. The method includes transforming the first image to a rectified image based on a relative rotational or translational position between the first stereo camera and the second stereo camera. The method includes selecting a first row of pixels from a first set of rows of pixels from the rectified image and a set of rows of pixels from a second set of rows of pixels from the second image. The method includes comparing the first row of pixels with each row of pixels from the set of rows of pixels from the second image to determine a set of disparity values and determining a pair of rows of pixels having the first row of pixels and a second row of pixels from the set of rows of pixels. The determined pair of rows of pixels has an offset no greater than an offset between the first row of pixels and each row of pixels from remaining rows of pixels from the set of rows of pixels. The method includes adjusting, based on the offset of the pair or rows of pixels, the relative rotational position between the first stereo camera and the second stereo camera.

DETAILED DESCRIPTION

Figure 1:
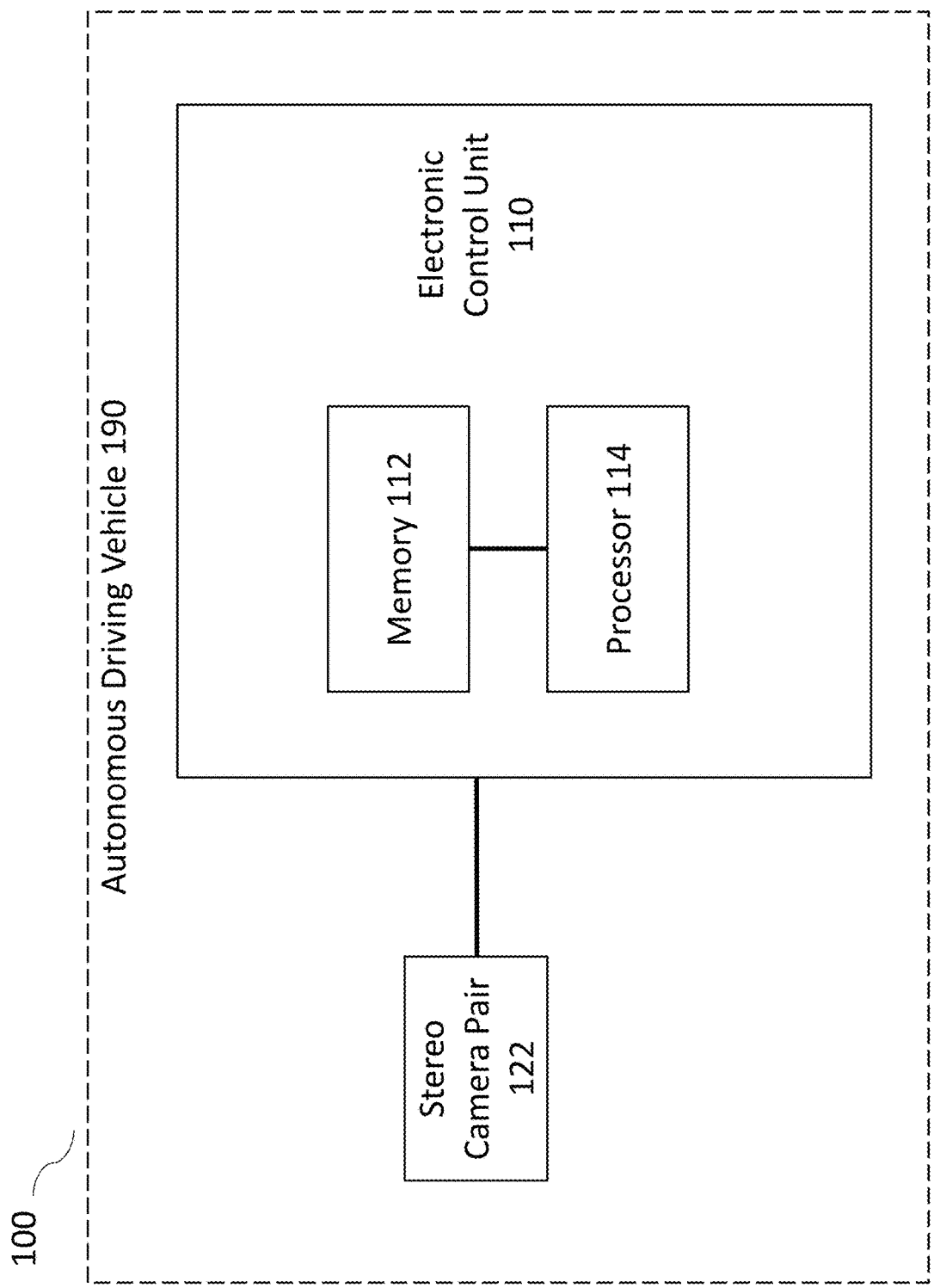
FIG. 1 shows a block diagram for a stereo calibration system 100, according to some embodiments.

A stereo camera pair includes a pair of cameras to capture a stereo image pair of a scene. The stereo image pair can be used to, for example, construct the three-dimensional (3D) image of a scene or determine the distances between objects in the scene and the stereo camera pair. To perform this computation, the relative translation and rotation of the stereo camera pair are used. In some situations, even when mounted rigidly on a mobile platform such as a vehicle, the relative translation and rotation of the stereo camera pair can change with the motion of the platform and/or over time.

One or more embodiments described herein include methods and apparatus to calculate, on-the-fly, the relative rotation between the stereo camera pair using a measure of similarity (or disparity values) between the stereo image pair in a computationally efficient manner. The described method can be, for example, applied for long-range stereo applications (e.g., to detect an object at a range of distance from the stereo camera pair greater than 100 meters). In some implementations, the computational efficiency can be achieved by focusing on a limited region of the image most sensitive to long range applications rather than performing processing on the entire image. In some implementations, the region of the image that is more sensitive to long range applications than other regions of the image includes regions where distant objects appear in the scene. For example, in an image of a road scene, a vehicle, the horizon, a bounding box of an object detected on the road, or a region having vanishing points of the lanes can be the region of the image that is more sensitive to long range application. In some implementations, the computational efficiency can be achieved by distributing the computation efficiently over a number of frames, so that per-frame computation is reduced. A vehicle can operate in a manual driving mode, or a vehicle can operate in a manual driving mode during one time period and operate in a partially autonomous mode or a fully autonomous driving mode during a different time period.

Autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). In some instances, a given level can include the capabilities included in the lower level(s); for example, level 2 can include the momentary driver assistance of level 0 and the driver assistance of level 1 but can also include additional assistance associated with level 2. An autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. For example, an autonomous capable vehicle can operate in a given level (e.g., level 2), which can be deactivated to allow a driver to operate the vehicle manually (i.e., in a manual driving mode). As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

FIG. 1 shows a block diagram for a stereo calibration system 100, according to some embodiments. The stereo calibration system 100 includes an electronic control unit 110, and the stereo camera pair 122 operatively coupled to the electronic control unit 110. In some implementations, the stereo camera pair 122 can include two or more than two stereo cameras. The electronic control unit 110 includes a processor 114, and memory 112 operatively coupled to the processor 114. The processor 114 can be configured to perform (or cause to be performed) any of the techniques, processes or methods discussed herein. In some implementations, the stereo calibration system 100 can be disposed in or with a vehicle 190, an unmanned aerial vehicle, a robotic device, a mobile electronic device, and/or a computer-assisted vision or perception device. The vehicle 190 can be, for example, a vehicle that operates fully autonomously and/or semi-autonomously (e.g., level 1 autonomy, level 2 autonomy, level 3 autonomy, level 4 autonomy and/or level 5 autonomy), and in some instances can operate under drive control (e.g., level 0 autonomy). In some implementations, the stereo camera pair 122 can be communicatively coupled to the electronic control unit 110 via a wired or wireless connection. In some implementations, the electronic control unit 110 and the stereo camera pair 122 may be disposed within a single device.

The processor 114 can be, for example, a hardware based integrated circuit (IC) or any other suitable processing device configured to run and/or execute a set of instructions or code. For example, the processor 114 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 114 can be configured to run any of the methods and/or portions of methods discussed herein.

The memory 112 can be, for example, a random-access memory (RAM), a memory buffer, a hard drive, a read-only memory (ROM), an erasable programmable read-only memory (EPROM), and/or the like. The memory 112 can store image data collected by the stereo camera pair 122, and any other data used by the processor 114 to perform the techniques discussed herein. In some instances, the memory 112 can store, for example, one or more software programs and/or code that can include instructions to cause the processor 114 to perform one or more processes, functions, and/or the like. In some implementations, the memory 112 can include extendible storage units that can be added and used incrementally. In some implementations, the memory 112 can be a portable memory (for example, a flash drive, a portable hard disk, and/or the like) that can be operatively coupled to the processor 114. In some instances, the memory 112 can be remotely operatively coupled with a compute device (not shown). For example, a remote database device can serve as a memory and be operatively coupled to the processor 114.

The memory 112 can store a software model(s) (not shown). The software model(s) can be, for example, an artificial intelligence (AI) model(s), a machine learning (ML) model(s), an analytical model(s), a mathematical model(s) or a combination thereof. After the processor 114 has received the data from the stereo camera pair 122, the processor 114 can process the image data using software model(s) to determine a relative rotational (or translational) positions of the stereo camera pair.

In some implementations, the stereo camera calibration system 100 can include one or more other sensors (not shown) to collect sensor data to facilitate the calibration of the stereo camera pair. The one or more other sensors can be used to observe and gather any information that would be useful for performing the techniques discussed herein, such as information associated with an external environment of the stereo camera calibration system 100 and/or the stereo camera calibration system 100 itself. The one or more other sensor(s) can include, for example, at least one of an inertial measurement unit (IMU), a camera, a radar, or a lidar. The one or more other sensors can collect sensor data that includes representations of attributes associated with the stereo camera calibration system 100. For example, if the stereo camera calibration system 100 is a vehicle (e.g., an autonomous vehicle), the data collected by the one or more other sensors can include the vehicle's speed, location, acceleration, size, and/or weight, etc. Additionally or alternatively, the one or more other sensors can collect sensor data that includes representations of attributes associated with an external environment of the stereo camera calibration system 100, such as a speed, location, acceleration, size, type, relative distance, movement pattern, etc. of other vehicles, pedestrians, animals, obstacles, etc., and/or location, type, relative distance, size, shape, etc. of signs, lane markers, shoulder areas, roads, buildings, etc. In some implementations, sensor data collected by the one or more other sensors includes information of a topography surrounding the stereo camera calibration system 100 that is relevant (or potentially useful), such as a road, sign, traffic light, walkway, building, body of water, etc.

As sensor data associated with the stereo camera calibration system 100 and/or the surrounding region of the stereo camera calibration system 100 is being captured by the sensor(s) (including the stereo camera pair 122 and other sensors not shown), processor 114 can analyze the sensor data to detect objects/obstacles near the stereo camera calibration system 100. For example, processor 114 can use software model(s) such as machine learning models (e.g., a computer vision model that uses a library of programming function such as those in OpenCV) to identify any type of object in an image captured by the stereo camera pair 122 (or lidar, or radar) and determine disparities of a row of pixels that meets the center of the detected object.

Figure 2:
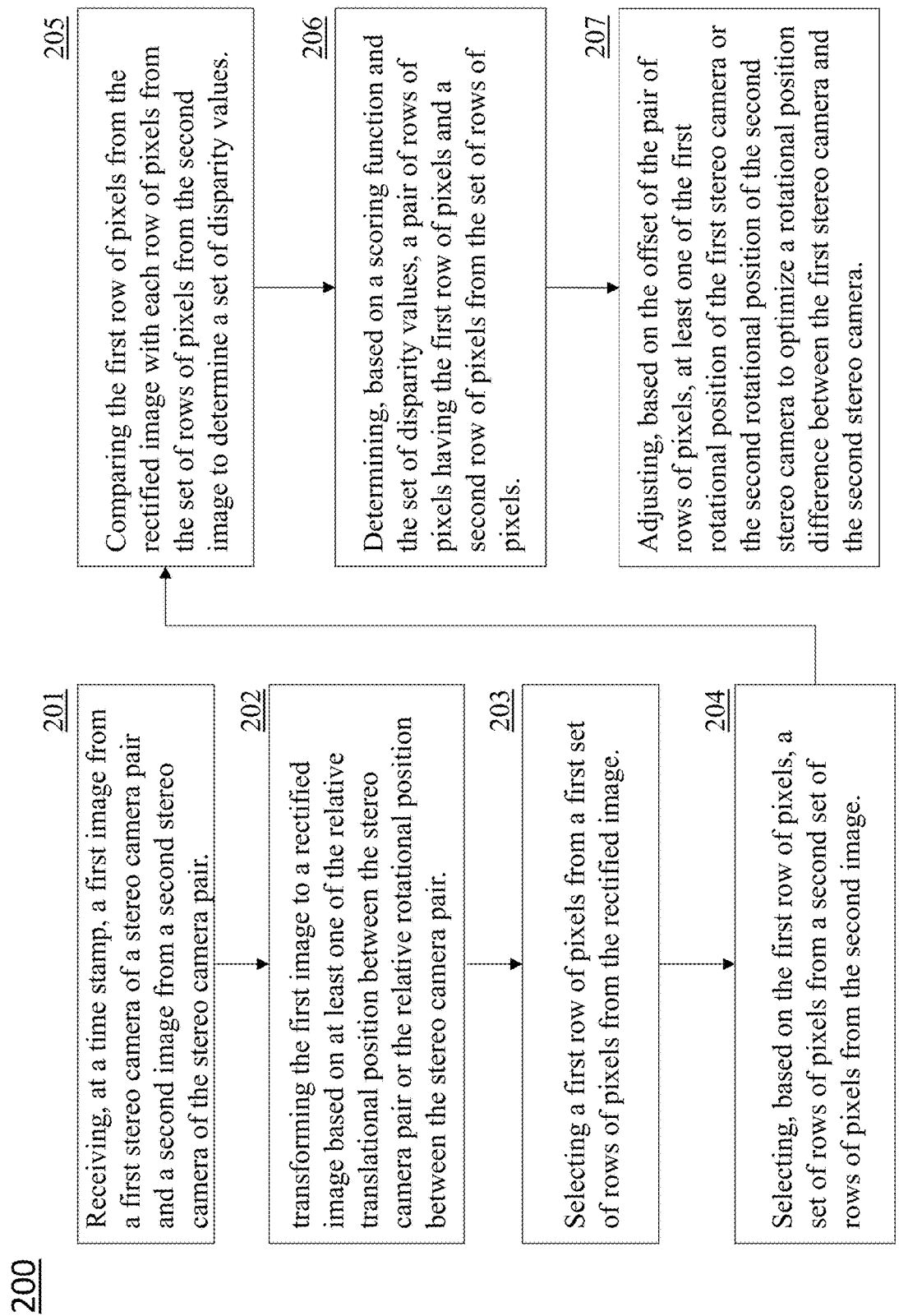
FIG. 2 illustrates a flow chart of an example stereo camera calibration process, according to some embodiments.

FIG. 2 illustrates a flow chart of an example stereo camera calibration process, according to some embodiments. In some embodiments, the stereo camera calibration process 200 can be implemented at a processor and/or a memory of a stereo camera calibration system (e.g., processor 114 or memory 112 of the electronic control unit 110 of the stereo camera calibration system 100 as discussed with respect to FIG. 1).

At 201, the stereo camera calibration process 200 includes receiving, at a time stamp, a first image from a first stereo camera of a stereo camera pair and a second image from a second stereo camera of the stereo camera pair. The stereo camera pair can be operatively coupled to the electronic control unit. In some implementations, the stereo camera pair can be disposed in a vehicle (e.g., an autonomous driving vehicle), unmanned aerial vehicle, a robotic device, a mobile electronic device, and/or computer-assisted vision or perception devices. In some implementations, the stereo camera pair is disposed on the vehicle while the vehicle is in motion. Thus, the stereo camera calibration process 200 can be performed on-the-fly while the vehicle is in motion.

In some implementations, the stereo camera pair (e.g., stereo camera pair 122) can be communicatively coupled to the electronic control unit (e.g., electronic control unit 110) via a wired or wireless connection. In some implementations, the electronic control unit (e.g., electronic control unit 110) and the stereo camera pair (e.g., stereo camera pair 122) may be disposed within a single device. In some implementations, the first stereo camera of the stereo camera pair and the second stereo camera of the stereo camera pair can take the first image and the second image, respectively, of a scene at the same time.

At 202, the stereo camera calibration process 200 includes transforming the first image to a rectified image based on (1) at least one of a first rotational position of the first stereo camera or a first translational position of the first stereo camera at the time stamp and (2) at least one of a second rotational position of the second stereo camera or a second translational position of the second stereo camera at the time stamp. In some implementations, transforming the first image to the rectified image includes a transformation process to project the first image and the second image onto a common image plane for the purpose of making a correspondence search between the two images go faster. The stereo camera calibration process 200 includes transforming the first image to a rectified image using an image rectification algorithm (e.g., a planar rectification, a cylindrical rectification, or a polar rectification) and can take into account lens distortion such as radial distortion, tangential distortion, and/or decentering distortion. In some implementations, the first stereo camera and the second stereo camera can be mounted on a platform with a pre-determined distance in between the two stereo cameras in the stereo camera pair. In some implementations, the horizontal position and the vertical position (collectively the translational position) of the first stereo camera can be defined as (0,0) and the horizontal position and the vertical position (collectively the translational position) of the second stereo camera relative to the first stereo camera can be defined as (x, y). In some implementations, the translational position of the second stereo camera relative to the translational position of the first stereo camera can be determined manually by an operator and stored in a processor (e.g., processor 114 in FIG. 1). In some implementations, the stereo camera pair is mounted on a computerized platform and the translational position of the second stereo camera relative to the first stereo camera can be sent from the computerized platform to the processor (e.g., processor 114 in FIG. 1). The computerized platform can include a mounting hardware that is operatively coupled to a processor (e.g., processor 114 in FIG. 1, a second processor, or a remote compute device). The processor can send signals to the mounting hardware on which the stereo camera pair is mounted to move each of the two stereo cameras to a different translational position and/or a rotational position.

In some implementations, the lens of the first stereo camera can be at a rotational position around the principal axes of the lens (e.g., the pitch axis, the roll axis, and the yaw axis). The rotational position of the first stereo camera can include a yaw angle, a pitch angle, and a roll angle. Similarly, the rotational position of the second stereo camera can include a yaw angle, a pitch angle, and a roll angle. In some implementations, transforming the first image to the rectified image can be based on at least one of a pitch angle difference, a yaw angle difference, or a roll angle difference between the first stereo camera and the second stereo camera (i.e., rotation of the lens of the first stereo camera with respect to the rotation of the lens of the second stereo camera). In some implementations, the rotational position of the second stereo camera relative to the rotational position of the first stereo camera can be determined manually by an operator and stored in a processor (e.g., processor 114 in FIG. 1). In some implementations, the stereo camera pair is mounted on a computerized platform and the rotational position of the second stereo camera relative to the first stereo camera can be sent from the computerized platform to the processor (e.g., processor 114 in FIG. 1).

In some implementations, the stereo camera calibration process 200 includes transforming, digitally by the processor, the first image captured by the first stereo camera to a rectified image based on at least one of (1) the relative translational positions (x, y) between the first stereo camera and the second stereo camera, (2) the relative rotational positions (relative yaw/pitch/roll angles) between the first stereo camera and the second stereo camera, or (3) lens distortion (e.g., radial distortion, tangential distortion, or decentering distortion). The relative translational and rotational positions are pre-determined by the operator, or determined by the computerized platform on which the stereo camera pair is mounted. For example, if the first stereo camera is at the translational position of (0 inches, 0 inches) and the rotational position of (0°, 0°, 0°), and the second stereo camera is at the translational position of (10 inches, 0 inches) and the rotational position of (5°, 10°, 0°), the processor can digitally process (translate and/or rotate) the first image to generate the rectified image as if the rectified image was captured at the translational position of (10 inches, 0 inches) and the rotational position of (5°, 10°, 0°).

In some implementations, step 202 of the stereo camera calibration process 200 can be used as a pre-processing (or normalization) step for further calibration of the stereo camera pair as discussed in steps 203-207. In some implementations, step 202 is optional and the stereo camera calibration process 200 can proceed from step 201 to step 203 without step 202 of transforming the first image to the rectified image.

Figure 3:
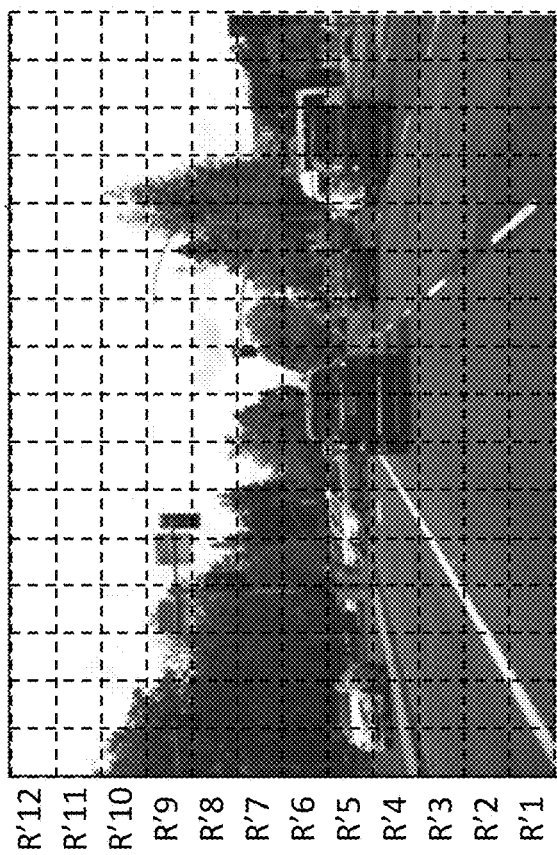
FIG. 3 illustrates an example of a two camera view from a stereo camera pair on a road scene, according to some embodiments.
Figure 3:
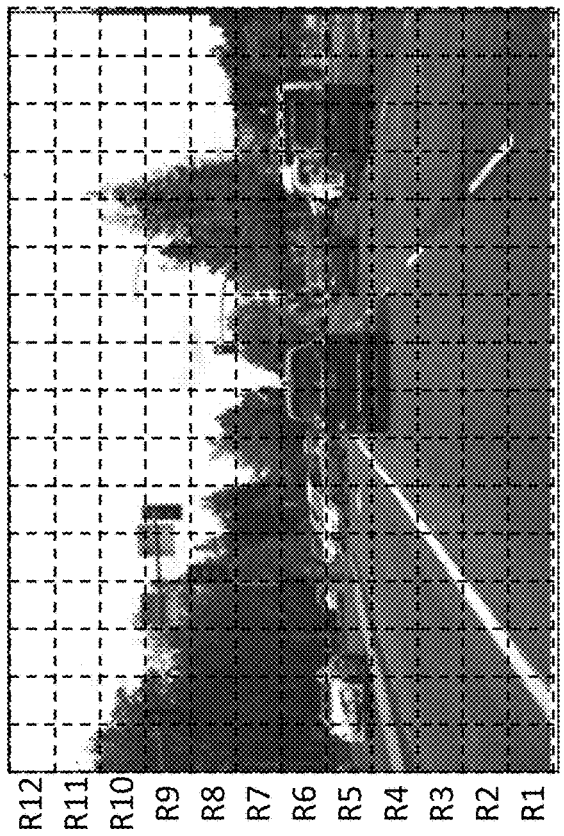

At 203, the stereo camera calibration process 200 includes selecting a first row of pixels from a first set of rows of pixels from the rectified image. At 204, the stereo camera calibration process 200 includes selecting, based on the first row of pixels, a set of rows of pixels from a second set of rows of pixels from the second image. The processor of the stereo camera calibration system can generate a grid having a set of rows and a set of columns for each image captured by the stereo camera pair. FIG. 3 illustrates an example of a two camera view from a stereo camera pair on a road scene, according to some embodiments. In some implementations, the image from the first stereo camera view can be the first image captured by the first stereo camera or the rectified image 301 after transforming the first image based on the relative translational and rotational positions of the stereo camera pair discussed as step 202. The image from the second stereo camera view can be the second image 302 captured by the second stereo camera at the same timestamp as the first image.

As shown in FIG. 3, the processor of the stereo camera calibration system can generate a grid having a set of rows (R1-R12) of the rectified image 301 and a grid having a set of rows (R'1-R'12) of the second image 302. The processor can select a first row of pixels (e.g., R1) from the rectified image 301 and a set of rows of pixels (e.g., R'1-R'6) of the second image 302. In some implementations, the processor can select the first row of pixels from the first set of rows of pixels from the rectified image to be substantially near horizon in the rectified image (e.g., row R1 or the first row of pixels from the bottom of the rectified image). In other implementations, the processor can select the first row of pixels from the rectified image to be last row (e.g., R12) of pixels from the bottom of the rectified image or the first row of pixels from the top of the rectified image. In some implementations, the processor can dynamically select the first row of pixels from the rectified image based on the motion of the stereo camera pair. For example, when the processor detects an object of interest (e.g., a moving vehicle) based on the first image (or the rectified image, the processor can select the first row of pixels to cross the center of the object of interest.

Returning to FIG. 2, at step 205, the stereo camera calibration process 200 includes comparing the first row of pixels selected from the rectified image 301 with each row of pixels from the set of rows of pixels from the second image 302 to determine a set of disparity values. In some implementations, the processor can compare the first row of pixels (e.g., R1) of the rectified image 301 with each of the set of rows of pixels (e.g., R'1-R'6) of the second image 302. At step 206, the stereo camera calibration process 200 includes determining, based on a scoring function and the set of disparity values, a pair of rows of pixels having the first row of pixels and a second row of pixels from the set of rows of pixels. The pair of rows of pixels has an offset no greater than an offset between the first row of pixels and each row of pixels from remaining rows of pixels from the set of rows of pixels.

For example, the processor can compare row R1 of the rectified image 301 with R'1 of the second image 302. For this comparison between row R1 and row R'1, in some implementations, the pixels in each column (C1-C16) in row R1 can be compared with the corresponding column (C'1-C'16) in row R'1 to calculate a disparity value for that column (e.g., the disparity value between R1C1 and R'1C'1 or D(R1C1-R'1C'1)). Thus, for the comparison between row R1 and row R'1, the processor can calculate a set of disparity values for each column: D(R1C1-R'1C'1), D(R1C2-R'1C'2), D(R1C3-R'1C'3) ... D(R1C16-R'1C'16). The processor can then calculate a disparity value of the row R1 and row R'1 (e.g., D(R1-R'1) based on a scoring function and the set of disparity value for each column (i.e., D(R1C1-R'1C'1), D(R1C2-R'1C'2), D(R1C3-R'1C'3) ... D(R1C16-R'1C'16)). Similarly, the processor can compare row R1 of the rectified image 301 with each row of the selected set of rows (e.g., R'2, R'3 ... R'6) of the second image 302 to calculate a set of disparity values between each pair of rows (i.e., D(R1-R'2), D(R1-R'3) ... D(R1-R'6)). In some implementations, the scoring function can be a model used to find the best match of pixels between two rows of pixels. For example, the scoring function can be based on Newton's Method, Gradient Descent, Sum of Squared-Differences (SSD), Sum of Absolute Differences (SAD), and/or the like.

Based on the set of disparity values between the first row of the rectified image 301 and each row of the selected set of rows of the second image 302, the processor can determine a row from the set of rows of the second image 302 that has the least difference among the set of disparity values (or the least offset from the first row of the rectified image 301 than the offsets between remaining rows from the set of rows of the second image 302 and the first row of the rectified image 301.) In some implementations, the difference between the set of disparity values can be an average of the differences between the disparity values of the corresponding columns of the rows, maximum difference among the set of disparity values, the minimum difference among the set of disparity values, and/or the like. For example, the processor can determine that the disparity between pixels from row R'3 of the second image 302 and pixels from row R1 of the rectified image 301 is less than the disparities between pixels from the remaining rows of the second image 302 (i.e., R'1, R'2, R'4, R'5, and R'6) and pixels from row R1 of the rectified image 301. Thus, the processor can determine that row R'3 of the second image 302 "best" matches row R1 of the rectified image 301.

In some implementations, instead of calculating a set of disparity values between the corresponding columns in each row (e.g., D(R1C1-R'1C'1), D(R1C2-R'1C'2), the processor can first select a cell of the first row of the rectified image 301 (e.g., R1C1) and find a pixel in a row from the set of rows of the second image 302 that has the best match to the pixel of the cell from the rectified image 301. For example, the processor can first select the cell of R1C1 from the rectified image 301 and then search each cell of row R'1 (i.e., cells R'1C'1-R'1C'16) to find the cell whose pixels generates a match to the cell R1C1 better than any other cells in row R'1 of the second image 302.

In some implementations, the stereo camera calibration process 200 includes comparing the second row of pixels (e.g., R2) of the rectified image 301 with the second set of rows of pixels (e.g., R'2-R'7) of the second image 302 to determine a row from the next set of rows of the second image 302 that has the least disparity (or offset) from the second row of the rectified image 301. For example, the processor can determine the disparity between pixels from row R'4 of the second image 302 and pixels from row R2 of the rectified image 301 is less than the disparities between pixels from the remaining rows of the second image 302 (i.e., R'2, R'3, R'5, R'6, and R'7) and pixels from row R2 of the rectified image 301. Thus, the processor can determine that row R'4 of the second image 302 "best" matches row R2 of the rectified image 301.

In some implementations, a disparity value from the set of disparity values for the pair of rows is a disparity value between a pixel from the first row of pixels and a pixel from the second row of pixels that is no greater than disparities between remaining pixels from the first row of pixels and remaining pixels from the second row of pixels.

At step 207, the stereo camera calibration process 200 includes adjusting, based on the offset of the pair of rows of pixels, at least one of the first rotational position of the first stereo camera or the second rotational position of the second stereo camera to optimize (or at least improve) a rotational position difference between the first stereo camera and the second stereo camera. In some implementations, the stereo camera calibration process 200 includes not adjusting the actual positions of the stereo cameras, but instead adjusting the estimated positions of the stereo cameras to use in the depth estimation between the object and the stereo camera pair. For example, upon determining that row R'3 of the second image 302 best matches row R1 of the rectified image 301 and row R'4 of the second image 302 best matches row R2 of the rectified image 301, the processor can adjust (e.g., through a computerized platform, gimbal, manually at a later recalibration step, or post-processing digitally after the images are captured by the stereo camera pair) the relative rotational position between the first stereo camera and the second stereo camera such that the images taken by the stereo camera pair are offset by two rows of pixels. The computerized platform can include a mounting hardware that is operatively coupled to a processor (e.g., processor 114 in FIG. 1, a second processor, or a remote compute device). The processor can send signals to the mounting hardware on which the stereo camera pair is mounted to move each of the two stereo cameras to a different translational position and/or a rotational position.

In some implementations, the first rotational position of the first stereo camera or the second rotational position of the second stereo camera includes a yaw angle, a pitch angle, and a roll angle. In some implementations, the adjusting the at least one of the first rotational position or the second rotational position includes adjusting at least one of a yaw angle of the first stereo camera, a pitch angle of the first stereo camera, or a roll angle of the first stereo camera. In some implementations, the processor can adjust the rotational position of the first stereo camera or the second stereo camera around the axis of the disparity. For example, for a horizontal stereo camera pair, the processor can adjust the rotational position of the first stereo camera or the second stereo camera around the x axis in the image (e.g., using the convention of vertical Y and horizontal X in images with origin at the top left corner). For a vertical stereo camera pair, the processor can adjust the rotational position of the first stereo camera or the second stereo camera around the y axis in the image.

In some implementations, the stereo calibration process 200 can include receiving, after adjusting the at least one of the first rotational position or the second rotational position (i.e., post-fine tuning of the calibration of the stereo camera pair), a third image from the first stereo camera capturing an object and a fourth image from the second stereo camera capturing the object. The processor can determine depth information between the object and the stereo camera pair (e.g., a depth value, or a depth map of the scene) based on the third image and the fourth image. In some instances where the stereo camera pair is disposed on a vehicle (e.g., an autonomous driving vehicle), the processor can send a signal to a control unit of the vehicle to control the movement of the autonomous driving vehicle (e.g., increase/decrease speed, change lanes, stop, turn, and/or other self-driving commands) based on the determined depth information between the object and the vehicle.

In some implementations, the stereo camera calibration process 200 can be used to calibrate or fine-tune the stereo camera pair while the stereo camera pair is used to detect an object at a range of distance from the stereo camera pair greater than 100 meters (e.g., for long range applications).

In some implementations, instead of calculating a disparity value for each row of pixels from a set of rows of pixels of the rectified image, the processor can calculate disparity values incrementally over images acquired at different times. Specifically, the stereo camera pair can capture the first image and the second image at a first time stamp and select a first row of pixels from the first image (or the rectified image) and a first set of rows from the second image to determine a pair of rows that has the least disparity. For example, the processor selects row 1 of the first image and determines R1 of the first image and row 3 from the second image has the least disparity (among rows 1-6 of the second image). Instead of continuing to calculate a disparity value between row 2 of the first image and a row from a set of rows from the second image, the processor can select a third image and a fourth image captured at a second time stamp by the stereo camera pair. Optionally, the processor can transform the third image to a third rectified image based on based on the relative translational and/or rotational position between the first stereo camera and the second stereo camera. The processor can select a third row of pixels from a third set of rows of pixels from the third rectified image (e.g., row 2 of the third rectified image) and select, based on the third row of pixels, a second set of rows of pixels (e.g., rows 2-7) from a fourth set of rows of pixels from the fourth image. The processor can compare the third row of pixels with each row of pixels from the second set of rows of pixels to determine a second set of disparity values. Similar to the process described above, the processor can determine, based on the scoring function and the second set of disparity values, a second pair of rows of pixels having the third row of pixels (e.g., row 2 of the third rectified image) and a fourth row of pixels (e.g., row 4 from the fourth image) from the second set of rows of pixels. The second pair of rows of pixels has a second offset no greater than an offset between the third row of pixels and each row of pixels from remaining rows of pixels from the second set of rows of pixels. Upon determining the offset, the processor can adjust, based on the first set of disparity values and the second set of disparity values, at least one of the first rotational position of the first stereo camera or the second rotational position of the second stereo camera. In some implementations, the processor is configured to calculate by only calculating the set of disparity values between a single row of pixels from each image frame of the first set of image frames and a set of rows of pixels from a corresponding image frame of the second set of image frames. In these implementations, the processor does not calculate disparities between the remaining rows of pixels from the first plurality of rows of pixels from the rectified image (e.g., rows 2-12 from the first rectified image) and the remaining rows of pixels from the second plurality of rows of pixels from the second image, to improve computational efficiency. In other words, this incremental computation (based on image frames captured at different times) allows lower computation cost at each time instant and enables a real time operation on constrained computational resources.

In some implementations, the processor can calculate disparity values incrementally over images acquired at different times for a pre-determined period of time. After adjusting the at least one of the first rotational position of the first stereo camera or the second rotational position of the second stereo camera for calibration, the processor can repeat the process and perform the calculations over images acquired during the next (pre-determined) period of time and calibrate the stereo camera pair again.

In some implementations, instead of comparing rows of pixels between the rectified image and the second image, the processor can compare columns (or any other lines in the image that are epipolar lines) of pixels to determine disparities. In some implementations, the epipolar line can be the straight line of intersection of the epipolar plane with the image plane. For example, the processor can compare the first column of pixels (C1) from the rectified image with each column of pixels from a set of columns of pixels (e.g., C'1-C'5) from the second image to determine a set of disparity values. Based on the disparity values and the scoring function, the processor can determine a pair of column of pixels (e.g., column C1 of the rectified image and column C'4 of the second image) that has the least disparity. In some implementations, the processor can calculate the disparities between the remaining columns of pixels of the rectified image and the columns of pixels of the rectified image to determine the adjustments to the relative rotational position of the stereo camera pair. In some implementations, the processor can calculate the disparities of the columns of pixels over image frames taken at different times.

As used herein, the singular forms "a," "an" and "the" include plural referents unless the context clearly dictates otherwise. Thus, for example, the term "a pixel" is intended to mean a single pixel or multiple pixels. For another example, the term "a image" is intended to mean a single Image or multiple images.

While various embodiments have been described and illustrated herein, one will readily envision a variety of other means and/or structures for performing the function and/or obtaining the results and/or one or more of the advantages described herein, and each of such variations and/or modifications is deemed to be within the scope of the embodiments described herein. More generally, one will readily appreciate that all parameters, dimensions, materials, and configurations described herein are meant to be examples and that the actual parameters, dimensions, materials, and/or configurations will depend upon the specific application or applications for which the teachings is/are used. One will recognize, or be able to ascertain using no more than routine experimentation, many equivalents to the specific embodiments described herein. It is, therefore, to be understood that the foregoing embodiments are presented by way of example only and that, within the scope of the disclosure, including the appended claims and equivalents thereto, disclosed embodiments may be practiced otherwise than as specifically described and claimed. Embodiments of the present disclosure are directed to each individual feature, system, tool, element, component, and/or method described herein. In addition, any combination of two or more such features, systems, articles, elements, components, and/or methods, if such features, systems, articles, elements, components, and/or methods are not mutually inconsistent, is included within the scope of the present disclosure.

The above-described embodiments can be implemented in any of numerous ways. For example, embodiments may be implemented using hardware, software or a combination thereof. When implemented in software, the software code can be stored (e.g., on non-transitory memory) and executed on any suitable processor or collection of processors, whether provided in a single computer or distributed among multiple computers.

Further, it should be appreciated that a compute device including a computer can be embodied in any of a number of forms, such as a rack-mounted computer, a desktop computer, a laptop computer, netbook computer, or a tablet computer. Additionally, a computer can be embedded in a device not generally regarded as a computer but with suitable processing capabilities, including a smart phone, a smart device, or any other suitable portable or fixed electronic device.

Also, a computer can have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer can receive input information through speech recognition or in other audible format.

Such computers can be interconnected by one or more networks in any suitable form, including a local area network or a wide area network, such as an enterprise network, and intelligent network (IN) or the Internet. Such networks can be based on any suitable technology and can operate according to any suitable protocol and can include wireless networks, wired networks or fiber optic networks.

The various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but can be distributed in a modular fashion amongst a number of different computers or processors to implement various aspects of the disclosure.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, various concepts can be embodied as one or more methods, of which an example has been provided. The acts performed as part of the method may be ordered in any suitable way. Accordingly, embodiments can be constructed in which acts are performed in an order different than illustrated, which can include performing some acts simultaneously, even though shown as sequential acts in illustrative embodiments. All publications, patent applications, patents, and other references mentioned herein are incorporated by reference in their entirety.

The invention claimed is:

1. A computer-implemented method comprising:
   receiving, by a computing system, a first image from a first camera and a second image from a second camera, the first image and the second image associated with a time stamp;
   transforming, by the computing system, the first image to a rectified image based on (1) at least one of a first rotational position of the first camera and a first translational position of the first camera at the time stamp and (2) at least one of a second rotational position of the second camera and a second translational position of the second camera at the time stamp;
   determining, by the computing system, a first row in the rectified image that corresponds with a second row in the second image, the determining comprising:
      determining, by the computing system, sets of disparity values for a first cell in the first row, starting from the left, in the rectified image and second rows of pixels from second cells in the second row for the second image based on a comparison of first pixels in the first cell with second pixels in the second cells, wherein the sets of disparity values indicate differences between the first pixels in the first cell and the second pixels in the second cells; and
      determining, by the computing system, a one of the second cells that corresponds with the first cell based on a scoring function and the sets of disparity values; and
   adjusting, by the computing system, at least one of: a first position of the first camera and a second position of the second camera based on an offset between pixels of the first cell and pixels of the one of the second cells.

2. The computer-implemented method of claim 1, wherein the determining the one of the second cells that corresponds with the first cell is based on at least one of: an average difference among the sets of disparity values, a maximum difference among the sets of disparity values, and a minimum difference among the sets of disparity values.

3. The computer-implemented method of claim 1, wherein
   the adjusting the at least one of: the first position of the first camera and the second position of the second camera is performed while a vehicle is in motion, the first camera and the second camera on the vehicle.

4. The computer-implemented method of claim 1, wherein the first rotational position of the first camera includes at least one of: a yaw angle, a pitch angle, and a roll angle.

5. The computer-implemented method of claim 1, wherein the adjusting the at least one of: the first position of the first camera or the second position of the second camera includes adjusting at least one of: a yaw angle, a pitch angle, and a roll angle.

6. The computer-implemented method of claim 1, wherein the first image and the second image include an object at a distance greater than 100 meters from the first camera and the second camera.

7. The computer-implemented method of claim 1, wherein the transforming the first image to the rectified image is further based on at least one of: a pitch angle difference, a yaw angle difference, and a roll angle difference between the first camera and the second camera.

8. The computer-implemented method of claim 1, wherein the first row in the rectified image is substantially near horizon in the rectified image.

9. The computer-implemented method of claim 1, wherein further comprising:
   determining, by the computing system, second sets of disparity values based on images received at different times for a predetermined period of time.

10. The computer-implemented method of claim 9, further comprising:
    adjusting, by the computing system, at least one of: a first position of the first camera and the second position of the second camera based on the images received at the different times for the predetermined period of time.

11. The computer-implemented method of claim 1, further comprising:
    receiving, by the computing system, a third image from the first camera and a fourth image from the second camera, the third image and the fourth image include an object; and
    determining, by the computing system, depth information associated with the object.

12. The computer-implemented method of claim 11, further comprising:
    sending, by the computing system, a signal to a control unit of a vehicle based on the depth information.

13. A system comprising:
    a processor; and
    a memory storing instructions that, when executed, cause the system to perform operations comprising:
       receiving a first image from a first camera and a second image from a second camera, the first image and the second image associated with a time stamp;
       transforming the first image to a rectified image based on (1) at least one of a first rotational position of the first camera and a first translational position of the first camera at the time stamp and (2) at least one of a second rotational position of the second camera and a second translational position of the second camera at the time stamp;
       determining a first row in the rectified image that corresponds with a second row in the second image, the determining comprising:
          determining sets of disparity values for a first cell in the first row, starting from the left, in the rectified image and second cells in the second row for the second image based on a comparison of first pixels in the first cell with second pixels in the second cells, wherein the sets of disparity values indicate differences between the first pixels in the first cell and the second pixels in the second cells; and
          determining a one of the second cells that corresponds with the first cell based on a scoring function and the sets of disparity values; and
       adjusting at least one of: a first position of the first camera and a second position of the second camera based on an offset between pixels of the first cell and pixels of the one of the second cells.

14. The system of claim 13, wherein the determining the one of the second cells that corresponds with the first cell is based on at least one of: an average difference among the sets of disparity values, a maximum difference among the sets of disparity values, and a minimum difference among the sets of disparity values.

15. The system of claim 13, wherein the at least one of: the first position of the first camera and the second position of the second camera is performed while a vehicle is in motion, the first camera and the second camera on the vehicle.

16. The system of claim 13, wherein the first rotational position of the first camera includes at least one of: a yaw angle, a pitch angle, and a roll angle.

17. The system of claim 13, wherein the adjusting the at least one of: the first position of the first camera or the second position of the second camera includes adjusting at least one of: a yaw angle, a pitch angle, and a roll angle.

18. A non-transitory computer-readable storage medium including instructions that, when executed by a computing system, cause the computing system to perform operations comprising:
    receiving a first image from a first camera and a second image from a second camera, the first image and the second image associated with a time stamp;
    transforming the first image to a rectified image based on (1) at least one of a first rotational position of the first camera and a first translational position of the first camera at the time stamp and (2) at least one of a second rotational position of the second camera and a second translational position of the second camera at the time stamp;
    determining a first row in the rectified image that corresponds with a second row in the second image, the determining comprising:
        determining sets of disparity values for a first cell in the first row, starting from the left, in the rectified image and second cells in the second row for the second image based on a comparison of first pixels in the first cell with second pixels in the second cells, wherein the sets of disparity values indicate differences between the first pixels in the first cell and the second pixels in the second cells; and
        determining a one of the second cells that corresponds with the first cell based on a scoring function and the sets of disparity values; and
    adjusting at least one of: a first position of the first camera and a second position of the second camera based on an offset between pixels of the first cell and pixels of the one of the second cells.

19. The non-transitory computer-readable storage medium of claim 18, wherein the determining the one of the second cells that corresponds with the first cell is based on at least one of: an average difference among the sets of disparity values, a maximum difference among the sets of disparity values, and a minimum difference among the sets of disparity values.

20. The non-transitory computer-readable storage medium of claim 18, wherein the at least one of: the first position of the first camera and the second position of the second camera is performed while a vehicle is in motion, the first camera and the second camera on the vehicle.

* * * * *